3,715,277
PREPARATION OF FIBERS CONTAINING FIBERS
Dino S. Dinelli, Via Ramiro Fabiani 1, Donato Milanese, Italy, and Franco Cognigni, Via Villafranco 10, Cesano Maderno, Italy
No Drawing. Filed June 26, 1969, Ser. No. 836,883
Claims priority, application Italy, June 26, 1968, 18,226/68; May 8, 1969, 16,551/69
Int. Cl. C07g 7/02
U.S. Cl. 195—63    16 Claims

ABSTRACT OF THE DISCLOSURE

Filaments of polymeric material are disclosed which contain discrete cells wherein droplets of enzymatic material are contained so that the enzymatic material is protected against loss of enzymatic activity and is prevented from escaping from the filaments but is permitted to exert a high degree of enzymatic activity in the presence of a substrate. A process for producing such filaments is also described which comprises mixing an enzymatic preparation with a liquid phase comprising a solution of a synthetic polymer, extruding the liquid phase through the orifices of a spinneret and then solidifying the polymer by removing the solvent therefrom.

---

The present invention relates to fibers containing enzymes and enzymatic extracts and to a process for preparing said fibers. It has long been known that several enzymes are capable of catalzing reactions which otherwise could not take place or would require operative conditions much more drastic.

Said enzymes are used too in reactions or on industrial scale with satisfactory results, however they present several drawbacks due to the difficulty of their manipulation and to the fact they cannot always be used more than one time as they disperse into the reaction products and cannot be recovered.

This engenders another drawback due to the fact that some enzymatic reactions may go on up to obtain a determined value of the conversion and beyond this value the enzyme exerts no more its catalytic action and in general is lost in the following treatments of removal of the product from the reagents. It is further to be noted that the enzyme, remaining in the reaction products, endangers their contamination.

The arts proposed up to now for obtaining insoluble enzymes may be grouped as follows:

(1) Physical adsorption of the enzyme on a polymeric powder;
(2) Anchorage by means of covalent bonds between functional groups of the enzyme and of a polymer;
(3) Mechanical englobing of the enzyme in a polymeric matrix.

However all these methods present several drawbacks: the physical adsorption is necessary reversible and therefore the so treated enzyme cannot be used for preparing a column suitable for the continuous working; the anchorage engenders a remarkable reduction of the enzymatic activity and further the realization of said process, besides being limited to few types of enzyme, is long and laborious; the mechanical englobing of the enzyme in a polymeric matrix in the form of powder, lamellae or microcapsule is rather laborious and yields products of difficult manipulation.

The main object of the present invention is a structure of easy preparation and preservation which contains, englobed, the desired enzyme with an unchanged activity and a high effectiveness.

A further scope of the invention is a structure such that the enzyme, therein englobed, could exert its catalytic activity without dispersing into the mass and being at the same time protected against the deactivating action of other enzymes or of micro-organisms present in the reaction mixtures. A further object of the present invention is the preparation of such a structure in an easy and effective way, with regular results and high effectiveness.

The structure according to the present invention comprises a fibrous or filamentous structural base of artificial or synthetic polymeric material and the required enzymes or enzymatic preparations therein englobed and subdivided and particularly enclosed in small alveoli or separated cavities.

In said structure the enzymes are separated from the outside ambient by a very thin membrane, which prevents the escape of the enzyme and its dispersion into the reaction mass, but allows however the enzyme to exert its catalytic action with a high effectiveness, being given the obtainable large active surface, and at the same time protects it from the deactivating action of the enzymes or microorganisms which might be present in the reaction mixture.

Such a behaviour of the structure is surprising and may be explained as the manifestation of a property of the membranes, forming a structure sufficiently pervious to the reaction medium while exerting the above mentioned protective action, and this for a very large range of polymeric materials of different nature as hereinafater said.

The polymeric filaments or fibers constituting the structural base englobing the enzymes, according to the invention, are characterized too in that they are utterly thin and therefore provided with a large surface, giving therefore very high yields. The diameters of said fibers or filaments are several microns but no more than some tens of microns, the smaller diameters being preferred for the larger specific surface they allow, e.g. fibers having a 4 micron diameter present a surface of 1 m.$^2$ per gram whereas fibers having a 20 micron diameter present a surface of 1 m.$^2$ each 5 grams. The size of the alveoli or cavities containing the enzymes is preferably small and on the average these single alveoli orcavities have a volume not higher than the one of a sphere having a 5 micron diameter.

The ratio by weight between the amounts of polymer and of enzymatic preparations may vary within a wide range, e.g. between 100:1 and 1:2, with reference, of course, to the total weight of the enzymatic preparation, including the enzyme carrier which may be water; which allows one to choose the most suitable enzymatic concentration to be used.

The possibility of preparing filamentous or fibrous structures having such a high content of enzyme must be considered wholly unexpected and surprising in view of the prior art.

The process, object too of the present invention, for preparing the filamentous or fibrous structure englobing the enzyme, according to the invention, comprises the preparing of a liquid phase containing a solution of the polymer in a suitable solvent and an enzyme or enzymatic preparation in the desired ratios and the spinning of said liquid phase by its extrusion through suitable spinneret orifices and the removing of the solvent from the polymer, with solidification of the structure, by extracting by means of a coagulating bath or by evaporating, i.e. by means of wet or dry spinning.

The filaments obtained in this way are preferably stretched, according to the usual textile art, but preferably with stretching ratios comparatively low as regards the usual practices in the textile art and lying within 1:1.1 and 1:7. They may be manufactured as continuous filaments or cut in short fibers.

Preferably the polymeric solution containing the enzyme to be spun is constituted by the emulsion of an enzymatic solution in the polymeric solution, but the enzymes could be englobed in the polymeric solution even in form of powder to be dispersed in said solution, or in form of solution in a solvent miscible with the polymeric solution, obtaining in the latter case a liquid phase constituted by a homogeneous solution which can be transformed into fibers, the enzyme being separated from the polymer at the moment of the removal of the solvent, or of the major part thereof, by way of coagulation or evaporation.

If operating, as preferred, by using an emulsion as a starting liquid phase, the enzymatic preparation is dispersed into the polymeric solution in the form of tiny droplets of the order of magnitude of emulsions, and preferably of linear size not higher than 5 microns. To facilitate the formation of the emulsion and to stabilize it, it is possible to add surface-active agents or the like products. Even if it is preferable to use regular emulsions, anyhow it is possible to transform into fiber even irregular emulsions and in this case we have the displacement of a determined part of the enzymatic preparation into the eventual coagulation bath, the recovering of which being made however possible and easy by making use of coagulating agents immiscible with the enzyme solvent.

The possibility of producing fibers englobing enzymes made of polymeric material having a thin size and an appropriate resistance, even if, of course, not so high as required for the use in the textile industry, was not foreseeable and is surprising.

All the less was the possibility of obtaining fibers by making use of usual spinning methods foreseeable. It was indeed expected that the spinning of emulsions of enzymatic preparations in polymer would be remarkably difficult, if not impossible, and would result in the production of filaments having mechanical features too low even for these uses; or it would have required at least special means and manipulations unsuitable for the realization on an industrial scale. In practice it has proved, on the contrary, that the emulsions, even with high concentrations of enzymatic preparations, are transformable into fibers with a good spinning behaviour and it is further possible to obtain fibers with mechanical features surprisingly little lower than the ones obtained by spinning of the polymeric solutions without enzymatic preparations. The polymers suitable for the process according to the invention must present different features.

First of all they must be able to exist in solution at temperatures consistent with the stability of the enzyme and, if operating in emulsion, they must be in solution in an essentially immiscible solvent or at least produce a solution essentially immiscible with the solvent wherein the enzyme is dissolved and dispersed. As the enzymes are generally in aqueous solution, the solvent is preferably chosen from the ones immiscible with water, in order to obtain an emulsion. Further the solvent of the polymer must not be harmful for the stability of the enzyme. Further the polymer must present no deactivating action as to the enzyme.

In the particular case of the wet spinning, the coagulant used too must be preferably immiscible with the liquid wherein the enzyme is dissolved or dispersed and not be harmful for the stability of the enzyme. The composition of the coagulating bath may vary within a large range: it is anyhow preferable that the concentration of the solvent of the polymer in the coagulating bath is kept lower than 50%. The temperature of the coagulating bath is not subjected to particular limits, but preferably is between 0° and 80° C. and in particular between 10° and 30° C.

If use is made, on the contrary, of a dry spinning process, it has been found that it is possible to use spinning temperatures higher than the ones endangering the inactivity of the enzyme. This is mainly due to the fact the time of residence at high temperature in said process is very short.

The fibrous and filamentous structures, according to the invention, may be used in different forms, preferably in the form of skeins and of staple.

Among the polymers which may englobe the enzymes it is possible to mention: the nitrate, esterified, etherified cellulosic polymers, the polymers and copolymers obtained from butadiene, isoprene, acrylonitrile, acrylates, methacrylates, vinylic esters, vinyl chloride, vinylidene chloride, styrene, and further the polyamides, the butyralpolyvinyl and the like, as well as mixtures thereof.

Enzyme of any type may be englobed in a fiber-shaped polymer, among them it is possible to mention: urease, invertase, lactase, ribonuclease, acylase, transaminases, glucose oxidase, catalase, arginase, papain, carboxy-peptidase, glucoamilase and the like.

As generally the enzymes are in aqueous solution, the solvent of the polymer is preferably chosen among the ones immiscible with water, e.g. use can be made of solutions of polymer in hydrocarbon halogenated derivatives, as methylene chloride, carbon tetrachloride, chloroform; alifatic hydrocarbons, as pentane, hexane, heptane, isoctane; aromatic hydrocarbons, as benzene, toluene, xylenes; hydrocarbons mixtures, as petrol ether; ethers, as diethyl-ether or isobutylic and isopropylic ether; esters, as n-butylacetate, isobutylacetate, isoamylacetate, methylpropionate, isobutylpropionate, isoamylformiate; ketones, as cyclohexanone.

The enzymes englobed in the fibers, according to the present invention, may be used as catalysts in the enzymic reactions operating both in batch and continuous processes.

It is possible to englobe into the fibers two or more different enzymes, mutually consistent, so as to obtain the desired reactions. On the other hand in several reactions it is possible to use two or more fibers containing different enzymes; these fibers may be used at the same time or in different following stages, so that the reaction products of the first stage might be further transformed in the subsequent stages.

A further advantage in the use of these new preparations derives from the fact that it is possible to realize required degrees of conversion, making it possible to interrupt suddenly and wholly the reaction by removing the filamentous structure containing the enzyme from the reaction space.

A further advantage is that with this system it is possible to obtain the protection of the englobed enzyme against the destructive atcion of imcroorganisms which can develop or anyhow be present in the reaction space; and further in the case of contamination by microorganisms of the filamentous structure, it is possible to decontaminate the latter by means of suitable washing and sterilization treatments.

It has been observed that, when carrying out an enzymatic reaction as to continuous process by means of the fibrous structures, according to the invention, there may form on the fibers colonies of bacteria and deposits of different nature (inorganic salts, carbon, dyes and in general all the by-products which don't participate to the enzymatic reaction) which interfere with the catalytic activity of the enzyme. The removal of the deposits is obtained in an easy and cheap way by washing the same fibers with suitable solvents. The solvents used are essentially of two types:

(a) solvents suitable to remove by dissolution the inorganic salts contained in the substrate and deposited on the fiber;

(b) solvents dissolving the organic compounds present in the substratum, as the dyes, the impurities of the substratum and the like.

Among the solvents of the (a) type it is possible to mention water, the polyhydroxyl alcohol as the glycerine, alkylenic glycols having from 2 to 4 carbon atoms, the mixtures water-glycerin, water-alkylenic glycols, water-trimethylolpropane, water-pentaerythrol and further the aqueous solutions of sugars.

Among the solvents of the (a) type it is possible to use the alifatic hydrocarbons having from 5 to 10 carbon atoms, the aromatic hydrocarbons from 6 to 10 carbon atoms, the cycloalifatic hydrocarbons from 4 to 10 carbon atoms, the dialkylic ethers having from 4 to 16 carbon atoms, the alcohols having from 4 to 18 carbon atoms, the esters having from 3 to 18 carbon atoms, the ketones having from 4 to 18 carbon atoms and the like.

It is preferable to carry out more than one washing and in general the fiber is at first subjected to a washing with a type (a) solvent and then with a type (b) solvent.

In a more preferred way it is possible to carry out the washing with a type (a) solvent and then with a type (b) solvent miscible at least partially with the type (a) one, then with a type (b) solvent immiscible with the type (a) one and sufficiently volatile. The washings are preferably performed together with a strong mechanical treatment such as not to damage the fibers but suitable to cause the physical removal of several deposits, e.g. several colonies of bacteria, which the dissolutions was unable to eliminate.

It is further to be noted that the type (b) solvents have a bacteriostatic and partially bactericide action too and therefore besides the mechanical removal it is possible to obtain a reduction of their activity. The following examples illustrate the invention only by way of example.

EXAMPLE 1

A spinning emulsion was prepared according to the following stages:

(a) An aqueous extraction of a raw enzymatic preparation (Urease Active Meal B.D.H.) was prepared by making use of a ball grinder.

The obtained suspension was centrifuged and the overfloating used for preparing the spinning mixture.

(b) There was prepared a solution of cellulose triacetate (cellulose triacetat purum Fluka) in methylene chloride at room temperature by making use of 5 g. of triacetate and 95 g. of methylene chloride, g. 48 of enzymic extract, obtained as described in (a), was added to said solution. The emulsion was stirred for 20' at about 1000 r.p.m. By microscope it is possible to observe a perfect dispersion; the droplets are regularly dispersed and have a 4–5μ size.

(c) There was prepared a solution of cellulose triacetate in methylene chloride by using a g. 43 of triacetate and g. 257 of methylene chloride.

G 148 of emulsion, prepared as described in (b), were added to this viscous solution, thereby obtaining the spinning emulsion. The composition of the spinning emulsion is the following:

|  | Percent |
| --- | --- |
| Methylene chloride | 78.60 |
| Cellulose triacetate | 10.70 |
| Enzymatic extract | 10.70 |
|  | 100.00 |

This emulsion was continuously stirred for about an hour, let rest for a further hour in order to eliminate the englobed air and then spun as follows.

The emulsion was poured into a 500 cc. thermostable container provided with a filtering plate and a spinneret having 48 holes per 80μ, dipped into a 56 cm. long dish containing, as a coagulating bath, toluol at about 20° C.

The feed to the spinneret was carried out by using a nitrogen pressure of about 2 atm. in the container. At the outlet from the coagulating dish the filament was collected by a first pair of rollers revolving at a speed of 11 m./min. and then stretched about 1.3 times by means of a second pair of rollers.

Therefrom the filaments were collected on a winding frame. The enzymatic activity of the filament obtained in this way has been compared with the activity of the extract used in preparing the filament.

The velocity of the hydrolysis reaction of urea into ammonium carbonate through the enzyme englobed in the fiber appeared to be about 50% of the one of a corresponding amount of enzyme in solution.

The activity measurements have been carried out at 30° C. by using as a substrate a 2% urea aqueous solution.

The amount of hydrolysed urea was determined by titrating the produced ammonium carbonate with HCl, O, 5 N, methyl orange indicator.

The mechanical features of these filaments, indicated "E," as compared with the ones of the pure cellulose triacetate filament, indicated "T," spun in the same conditions are given in Table 1.

TABLE 1

| Indication | Titre (den.) | Tenacity, g./den. | | | Percent elongation | |
| --- | --- | --- | --- | --- | --- | --- |
|  |  | Cond. | Wet | Knot | Cond. | Wet |
| E | 5.34 | 1.18 | 1.10 | 0.60 | 10 | 11 |
| T | 7.19 | 1.49 | 1.52 | 0.86 | 19 | 20 |

The features of permeability to the substratum and to the transformation product and of permeability to the enzyme of these fibers are shown by the fact the fibers exert an enzymatic activity and, once the fibers are removed from the reaction medium, the activity stops suddenly and wholly.

EXAMPLE 2

There was prepared a spinning emulsion by making use of an enzymatic preparation named "Invertase concentrate B.D.H." and operating as follows:

(a) There was prepared a solution of cellulose triacetate in methylene chloride at room temperature by using 10 g. of cellulose triacetate and 190 g. of methylene chloride. g 40 of "invertase concentrate B.D.H." are added to such a solution. The emulsion was stirred for 20' at about 1000 r.p.m.

(b) There was prepared a solution of cellulose triacetate in methylene chloride by making use of g 86 of triacetate and g 514 of methylene chloride.

After dissolution g 240 of emulsion prepared in (a) have been added to this solution.

The composition of the spinning emulsion is the following:

|  | Percent |
| --- | --- |
| Cellulose triacetate | 11.42 |
| Invert conc. B.D.H. | 4.76 |
| Methylene chloride | 83.82 |
|  | 100.00 |

The emulsion was wet spun as described in Example 1.

The enzymatic activity of the filament was compared with the activity of the enzymatic preparation (Invertase Conc. B.D.H.) used in preparing the filament.

The velocity of the hydrolisis reaction of saccharose to glucose and fructose catalyzed by the enzyme englobed in the fiber appeared equal to about 16% of the one of a corresponding amount of enzyme in solution. The activity measures were carried out by using as a substrate a 20% weight/volume saccharose solution, buffered to pH 4.5 with 0.1 M monosodium phosphate.

EXAMPLE 3

According to the procedure described in Example 2 we have prepared three filaments of cellulose triacetate containing equal volumes of solutions of invertase obtained by diluting with a glycerin-water mixture (55/45 parts by weight) invertase concentrate B.D.H.

In Table 2 are given the results of the kinetic measures of the hydrolisis reaction of saccharose catalyzed by the invertase englobed in the different filaments and by the invertase in solution.

TABLE 2

| $E_o$, percent | $V/_oi$ | $\eta\%$ |
|---|---|---|
| 100 | 0.2317 | 15.80 |
| 50 | 0.3616 | 24.70 |
| 30 | 0.3702 | 25.40 |
| 10 | 0.6190 | 43.40 |
| Enzyme in solution | 1.42 | 100 |

Substrate: 20% weight/vol. 0.1 M phosphate buffer saccharose (pH 4.5) wherein: $E_o$ is the percent concentration b.w. of "invertase concentrate B.D.H." in the solution of enzyme used in preparing the different filaments;

$V/_{oi}$ is the hydrolisis velocity of saccharose in millimoles per minute in presence of 1 g. of "invertase concentrate" per liter of reaction mixture;

$\eta\%$ is the percentage catalytic yield of the englobed enzyme as to the enzyme in solution.

EXAMPLE 4

As described in the foregoing examples there was prepared 2 kg. of spinning emulsion by using a solution of invertase containing 50% of "invertase concentrate B.D.H."

The emulsion was fed through a 0.22 cc./rev. proportioning gear pump, after having been filtered on a 16.000 mesh/cm.$^2$ metal grid, to a spinneret with 100 holes having a 80$\mu$ diameter dipped in a dish containing as a coagulating bath toluol at room temperature.

The flow of the proportioning pump was adjusted so as, with a final spinning velocity of about 20 m./min. to obtain filaments having a floss count in a first case of about 3 den./ floss and in a second case of about 15 den./floss.

For these two filaments the percentage catalytic yield as to the enzyme in solution was determined as specified in the foregoing example and for the filament having a 3 den./floss count a 50% catalytic yield was found, whereas for the 15 den. floss count a 25% catalytic yield.

EXAMPLE 5

According to the procedure described in the foregoing examples filaments of cellulose triacetate were prepared by using g 144 of cellulose triacetate and g 9 of "invertase concentrate B.D.H." diluted with a glycerin/water mixture up to g 60 so as to have a ratio polymer/enzyme solution of 1/0.416. In this case the concentration of the "invertase concentrate" in the enzyme solution for preparing the filaments is 15%. 90 g. of these filaments in form of skeins were arranged in a glass column having a 50 mm. diameter, a 800 mm. height and a casing unit for the thermostating.

In this column, thermostated at 20° C., a 20% weight/vol. saccharose solution in 0.1 M phosphate buffer was fed continuously through a proportioning pump.

The feeding rate was adjusted on 2900 cc./24 h.; in these conditions it was possible to obtain in the first month of running a conversion of saccharose into inverted sugar of about 70%, corresponding therefore to about 400 g. of inverted sugar in 24 hours. Finding that after a month of continuous work the catalystic activity of the invertase was decreased and the aspect of the fibers contained in the column was changed, i.e. they had become yellow and were covered in several spots with colonies of bacteria, the columns were emptied and the skeins washed.

This washing was carried out by mechanically stirring the skeins in a glyceri-water mixture containing 55% by weight of glycerin. The operation was repeated until clear washing waters were obtained. A similar washing was carried out with n-butylalcohol and finally with toluol. With these operations the fiber recovered the initial aspect.

After drying under vacuum at room temperature the skeins were anew introduced into the column. Thereafter the feeding with 20% saccharose solution was started again.

In all the preformed tests, whose results are given in Table 3, we have observed a return of the catalytic activity to the initial values.

Table 3

| Progressive duration days: | Amount of attained invert sugar g./24 h. |
|---|---|
| 1 | 400. |
| 10 | 380. |
| 20 | 360. |
| 30 | 330. |
| 31 | Washing. |
| 32 | 395. |
| 60 | 340. |
| 61–62 | Washing. |
| 63 | 390. |
| 80 | 345. |
| 81 | Washing. |
| 82 | 395. |

After a 30 days period of activity the washing was repeated according to the operative conditions hereinbefore reported. The enzymes could exert in such a way their catalytic activity for 10 months without showing any prohibitive decrease of the activity.

EXAMPLE 6

A filament of cellulose triacetate containing ribonuclease (ribonuclease grade II Seravac) was prepared by operating as follows: 48 mg. of ribonuclease dissolved in 14.5 cc. of distilled water were added under stirring to a solution consisting of 3.5 g. cellulose triacetate and 66.5 g. of methylene chloride. After stirring for 20 minutes at about 1000 revol./minute, the obtained emulsion was added to a solution containing 30 g. of cellulose triacetate and 180 g. of methylene chloride.

The emulsion was spun as in Example 1.

The activity of ribonuclease englobed in the filament was determined by using as a substrate a solution of cytidyl (2′, 3′) cyclic phosphate in a dimethyl glutaric buffer with an optical density of 1.2 at 186 m$\mu$.

190 mg. of fiber were used in 10 ml. of the substrate solution. After 24 h. the optical density of the reaction mixture remained constant.

The thin layer chromatographic analysis showed the complete disappearance of the substrate from the solution.

EXAMPLE 7

According to the operative conditions of the Example 1 a spinning emulsion was prepared consisting of a 14% by weight solution of cellulose triacetate in methylene chloride, containing the enzyme "Invertase concentrate B.D.H." In such an emulsion the concentration "E" of the invertase concentrate B.D.H. was 15% by weight. The emulsion was dry spun by using a spinneret having a single orifice of 200$\mu$ diameter, a glass tube for the evaporation of the solvent having a diameter of about 80 mm. and a length of about 2 m. an air stream at 50° C. being passed through.

The monofilament was recovered by a winding frame at a speed of about 80 m./minute. The catalytic yield of the englobed enzyme in such a filament was about 6% with respect to the enzyme in solution.

EXAMPLE 8

A filament containing $\beta$-galactosidase was prepared by operating in the following way:

15 g. of a solution containing 225 mg. of "$\beta$-galactosidase from yeast B.D.H." was added to a 70 g. of a 5% solution of cellulose triacetate in methylene chloride.

After emulsifying by stirring, the above mixture was added to 210 g. of a 14.3% solution of cellulose triacetate in methylene chloride. The emulsion was wet-spun as described in the Example 1.

The catalytic activity of said filaments was determined by using as a substrate a 0.016 M of a solution of o-nitrophenyl-β-D-galacto-pyranose in buffer tris (pH 7.6). The catalytic yield "η%" of said englobed enzyme was about 25% of the enzyme in solution.

EXAMPLE 9

A filament containing urease was prepared in the following way:

58 g. of water extract of "Urease active meal B.D.H." obtained as in Example 1 was added to 290 g. of a 25% solution of vinyl resin VAGH Union Carbide (copolymer 90% vinyl chloride, 10% vinyl acetate saponified for 70%) in methylene chloride.

The emulsion was spun through 48 holes having 80μ diameter spinneret immersed in a tray containing petroleum ether (boiling between 40 and 70° C.) as a coagulating bath. The filament was recovered after coagulation at a speed of 11 m./minute stretched 1.5 time and gathered on a winding frame.

The catalytic yield of the above englobed enzyme was lower than the one of the Example 1.

EXAMPLE 10

A filament containing urease was prepared by using as a shielding polymer Ethocel Medium Dow (ethyl-cellulose). The filament was prepared as follows:

50 g. of water extract of urease as employed in Examples 1 and 9 were added to 100 g. of a 5% solution of Ethocel in methylene chloride. The so obtained emulsion was added to 294 g. of 15% solution of Ethocel in methylene chloride.

The resulting mixture was wet spun through a spinneret having 10 holes of 80μ diameter using petroleum ether (B.P. 40–70 C.) as a coagulating bath. The obtained filament showed a catalytic yield of about 16% as compared to the urease in solution.

EXAMPLE 11

Three filaments of cellulose triacetate containing papain were prepared with different concentrations of the enzyme in the filament by operating in the following way:

20 cc. of a water of solution of "Papain" enzymatic preparation of Worthington Biochemical Co. were added to 200 g. of a 5% solution of cellulose triacetate in methylene chloride.

The concentrations employed in each filament are reported in Table 4. The so obtained emulsion was added to 354 g. of a 14% solution of cellulose triacetate in methylene chloride.

In order to promote emulsifying the mixture was mechanically stirred for one hour and allowed to stand for a two hour period. The emulsion, presenting a sufficient dispersity observed with the optical microscope, was wet-spun according to the abovesaid operative conditions in a toluene bath at room temperature.

The results of the activity of the enzyme englobed in the single filaments compared with the free enzyme are reported in Table 4.

TABLE 4

| Mg. enzyme/g. filament | Activity, percent |
|---|---|
| 0.5 | 16.7 |
| 1.33 | 12.4 |
| 11.7 | 8.1 |

The activity was measured by using as a substrate benzoilarginine-ethyl-ester with a potentiometric determination of the produced acid.

EXAMPLE 12

Under the same conditions as Example 11, filaments of cellulose triacetate were prepared with different enzymes. The results are summarized in Table 5.

TABLE 5

| Enzyme | Mg. enzyme/ g. filament | Percent activity compared with the free enzyme |
|---|---|---|
| Gluco-amylase (Diasyme powder of Takamine Miles Chemical Co.). | 10 | 11 (substrate maltose 10% weight/volume). |
| Carboxy-peptidase A ("Carboxy Peptidase of Worthington Biochemical Co."). | 0.42 | 10 (substrate hippuril-L-phenylalanine 0.01 M in a buffer tris pH 7.5). |

EXAMPLE 13

A 8% solution of poly-γ-ethyl-L-glutamato in chloroform were prepared. 1 cc. of enzymatic preparation "invertase concentrate B.D.H." was added to the above solution (50 g.) under strong mechanical stirring.

The so obtained emulsion was wet-spun by using a spinneret of 10 holes having 80μ diameter and a coagulating bath of n-hexane kept at a temperature of 20°–30° C. The obtained fibers, after drying under vacuum, showed an enzymatic activity of 18% compared with the free enzyme.

EXAMPLE 14

A 13% solution of 200 g. of polybutadiene-polyacrylonytrile "Europrene BJLT ANIC" in methylene chloride was prepared. 10 cc. of an enzymatic preparation "Invertase concentrate B.D.H." were added under vigorous mechanical stirring, to the above solution.

The so obtained emulsion was wet-spun by using a spinneret having 5 holes of 125μ diameter and n-heptane as coagulating bath. The activity of the englobed enzyme was 10% compared with the free enzyme.

EXAMPLE 15

10 cc. of enzymatic preparation "Invertase concentrate B.D.H." were added to 230 g. of a 14% solution vinyl resin Vyns Union Carbide in methylene chloride. The emulsion, even though mechanically stirred for a long time was not sufficiently dispersed when observed with an optical microscope, presenting droplets having a size more than 30μ.

The emulsion was nevertheless wet spun through a spinneret having 48 holes of 80μ diameter by coagulating it in a tray containing petroleum ether (B.P. 40–70° C.).

The filament, after coagulation, was recovered at a speed of 11 m./minute, stretched 1.5 times and wound on a winding frame.

During the spinning the passage of some droplets of the enzyme solution was observed. These droplets, being immiscible with the coagulation bath, deposit themselves in the bottom of the coagulation tray. The droplets, after being mechanically separated, were "Invertase concentrate B.D.H." having an activity very close to the one of the pure product. 4 cc. of the enzymatic preparation were recovered in such a way. The filament after drying presents an enzymatic activity of 4% compared with the free enzymatic preparation.

EXAMPLE 16

100 g. of a 25% solution of polycaprolactone in toluene were prepared. The polymer was obtained by synthesis with LiH, (η relative=3.5 1% benzene solution at 20° C.).

10 cc. of "invertase concentrate B.D.H." were added to the above solution. The obtained emulsion was wet-spun by using a spinneret with 48 holes having 80μ diameter; coagulation bath: petroleum ether.

The resulting filament presents an activity of 5% compared with the free enzymatic preparation.

EXAMPLE 17

A filament of cellulose triacetate containing for each gram of the filament 100 mg. of glucose oxidase (BDH cat 108559) and 0.4 mg. of catalase (crystal suspension in water saturated with tymol Boehringer, catalogue 15674 EKAA) was prepared according to the procedure described in the Example 2.

The enzymatic activity of the filament was measured by employing as a substrate a 0.1 M solution of glucose in phosphate buffer 0.2 M (pH 5.6 at 20° C.).

50 ml. of the substrate solution and 2 g. of the filament were poured in a 100 ml. flask closed with cotton-wool.

The disappearance of the glucose was controlled by iodometric titration. After 36 h., the glucose had almost completely disappeared. The test was repeated five times in the same conditions with a fresh substrate solution and with the same filament sample, always obtaining the complete oxidation of the glucose with a practically constant yield.

We claim:

1. Structure containing enzymatic preparations adapted to exert a catalytic activity in enzymatic reactions, comprising a filamentous structural base of synthetic polymeric material forming individual fibers having a floss count of from about 3 up to about 15 den./floss, and subdivided quantities of said enzymatic preparations englobed in said fibers in separated alveoli having a mean volume not higher than that of a 5-micron sphere so as to be separated from the outside by a thin membrane preventing the escape and protecting said enzymatic preparation so as to permit it to exercise its catalytic activity.

2. Structure according to claim 1 wherein the ratio by weight between polymer and enzymatic preparation varies between 100:1 and 1:2.

3. Structure according to claim 1 wherein the polymeric material is a cellulose derivative.

4. Structure according to claim 1 wherein said polymeric material is a member of the group consisting of polyamides, acrylonitrile polymers and copolymers, butadiene, isoprene, polyacrylates, polymethacrylates, vinyl esters, vinyl chloride polymers and copolymers, vinylidene chloride, polystyrene, butyralpolyvinyl and mixtures thereof.

5. Structure according to claim 1 wherein the enzyme is a member of the group consisting of urease, invertase, lactase, ribonuclease, acylase, transaminases, glucose-oxidase, catalase, arginase, papain, carboxy-peptidase, gluco-amylase.

6. Process for preparing enzyme-containing filamentary structures comprising the steps of preparing a solution of a fiber forming polymer in a solvent for said polymer, preparing a solution of said enzyme in a solvent that is immiscible with said polymer solution, mixing said solutions to produce an emulsion having a continuous phase of said polymer solution incorporating a discrete phase of said enzyme solution, extruding said solution through spinneret orifices, and removing said solvents to produce solid enzymatically active filaments of said polymer containing subdivided quantities of said enzyme englobed in tiny discrete alveoli and separated from the outside by a thin membrane protecting said enzyme and preventing its escape.

7. Process according to claim 6 wherein the solidified filaments are stretched.

8. Process according to claim 6, wherein the solvent of the polymer is removed by evaporation.

9. Process according to claim 6, wherein the enzyme solution is dispersed in the solution of the polymer to obtain droplets of linear size not higher than 5 microns.

10. Process according to claim 6 wherein the solvent for the polymer is immiscible with water.

11. Process according to claim 6, wherein the solvent for the polymer is not harmful of the stability of the enzyme and has no deactivating action thereon.

12. Process for preparing enzyme-containing filamentary structures, comprising the steps of preparing an emulsion of a liquid enzymatic material in a solution of a fiber forming polymer in a solvent immiscible with said enzymatic material, said polymer solution being the continuous phase of said emulsion, and extruding said emulsion through spinneret orifices into coagulating bath immiscible with said liquid enzymatic material to coagulate said polymer and produce solid enzyme-containing filaments that are catalytically active, wherein subdivided quantities of said enzyme are englobed in tiny discrete alveoli and separated from the outside by a thin membrane protecting said enzyme and preventing its escape.

13. Process according to claim 12 wherein the temperature of the coagulating bath lies within 0 and 80° C.

14. Process according to claim 12, in which the enzymatic material is a solution.

15. Process according to claim 14, in which the solution is an aqueous solution.

16. Process according to claim 13, wherein the temperature of the coagulating bath lies within 0° and 30° C.

References Cited

UNITED STATES PATENTS

| | | | |
|---|---|---|---|
| 3,235,634 | 2/1966 | Michel | 264—49 |
| 3,322,611 | 5/1967 | Stevenson | 264—49 X |

FOREIGN PATENTS

| | | | |
|---|---|---|---|
| 1,046,409 | 10/1966 | Great Britain. | |
| 385,673 | 1/1933 | Great Britain. | |
| 634,668 | 1963 | Belgium | 252—316 |

OTHER REFERENCES

Chang, T. M. S.: Science, vol. 146, October 1964 (pp. 524–525).

LIONEL M. SHAPIRO, Primary Examiner

D. M. NAFF, Assistant Examiner

U.S. Cl. X.R.

195—68, DIG 11, 54

UNITED STATES PATENT OFFICE
CERTIFICATE OF CORRECTION

PO-1050 (5/69)

Patent No. 3,715,277          Dated February 6, 1973

Inventor(s) Dino Dinelli and Franco Cognigni

It is certified that error appears in the above-identified patent and that said Letters Patent are hereby corrected as shown below:

Column 1, line 2, correct the title to read:
--PREPARATION OF FIBERS CONTAINING ENZYMES--.

Column 1, change line 3 to read as follows: --Dino Dinelli Via Ramiro Fabiani 1, S. Donato, Milanese,--.

Column 1, between lines 5 and 6, insert --Assignee: Snam Progetti, S.p.A., Milan, Italy--.

Column 1, line 34, "or on" should read -- on an --.

Column 2, line 1, "scope" should read --object--.

Column 3, line 34, "indeed" should read --to be--.

Column 4, line 49, correct spelling of --action.
line 49, correct spelling of --microorganisms--.
line 56, "as to" should read --as a--.
lines 71-72 "substratum" should read --substrate--.
line 74, "alcohol" should read --alcohols--.

Column 5, line 4, "(a)" should read --(b)--.

Column 7, line 28, "0.22" should read --0.292--.
line 42, after "yield" insert --was found--.
line 60, "on" should read --at--.
line 71, "glyceri" should read --glycerine--.

Column 8, line 10, "attained" should read --obtained--.

Signed and sealed this 2nd day of April 1974.

(SEAL)
Attest:

EDWARD M. FLETCHER, JR.
Attesting Officer

C. MARSHALL DANN
Commissioner of Patents